F. P. GLOSH.
OVERLOAD CLUTCH.
APPLICATION FILED AUG. 5, 1911.
1,033,794.
Patented July 30, 1912.
2 SHEETS—SHEET 2.
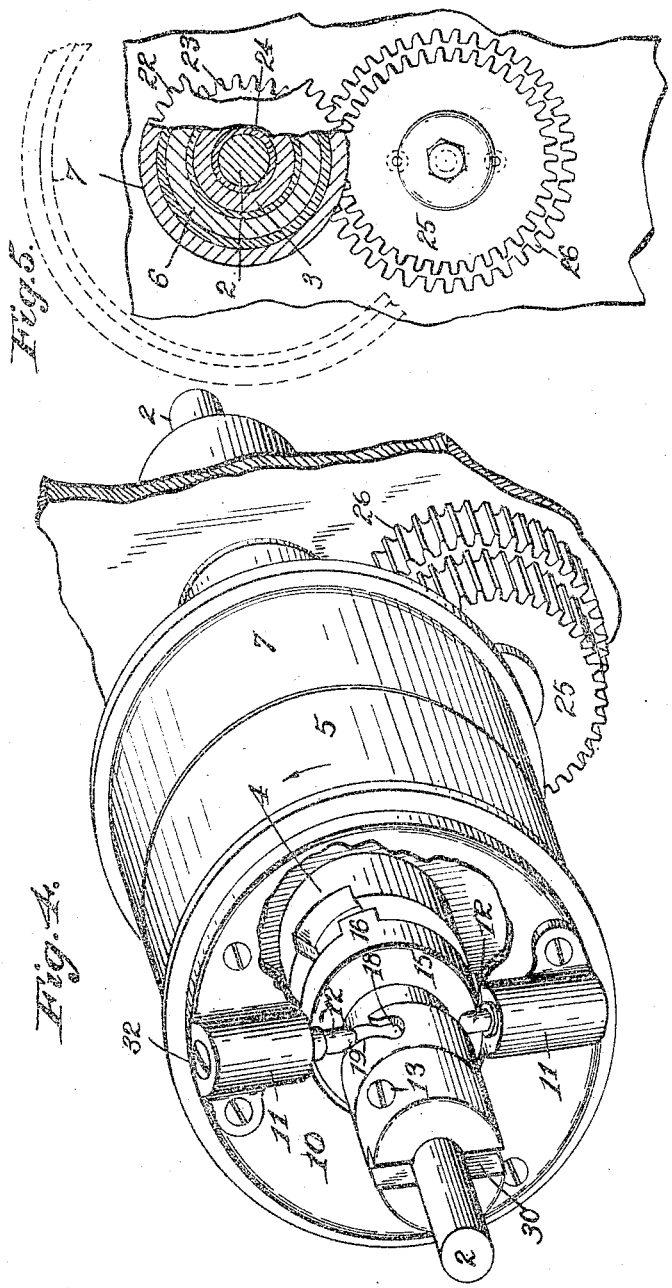

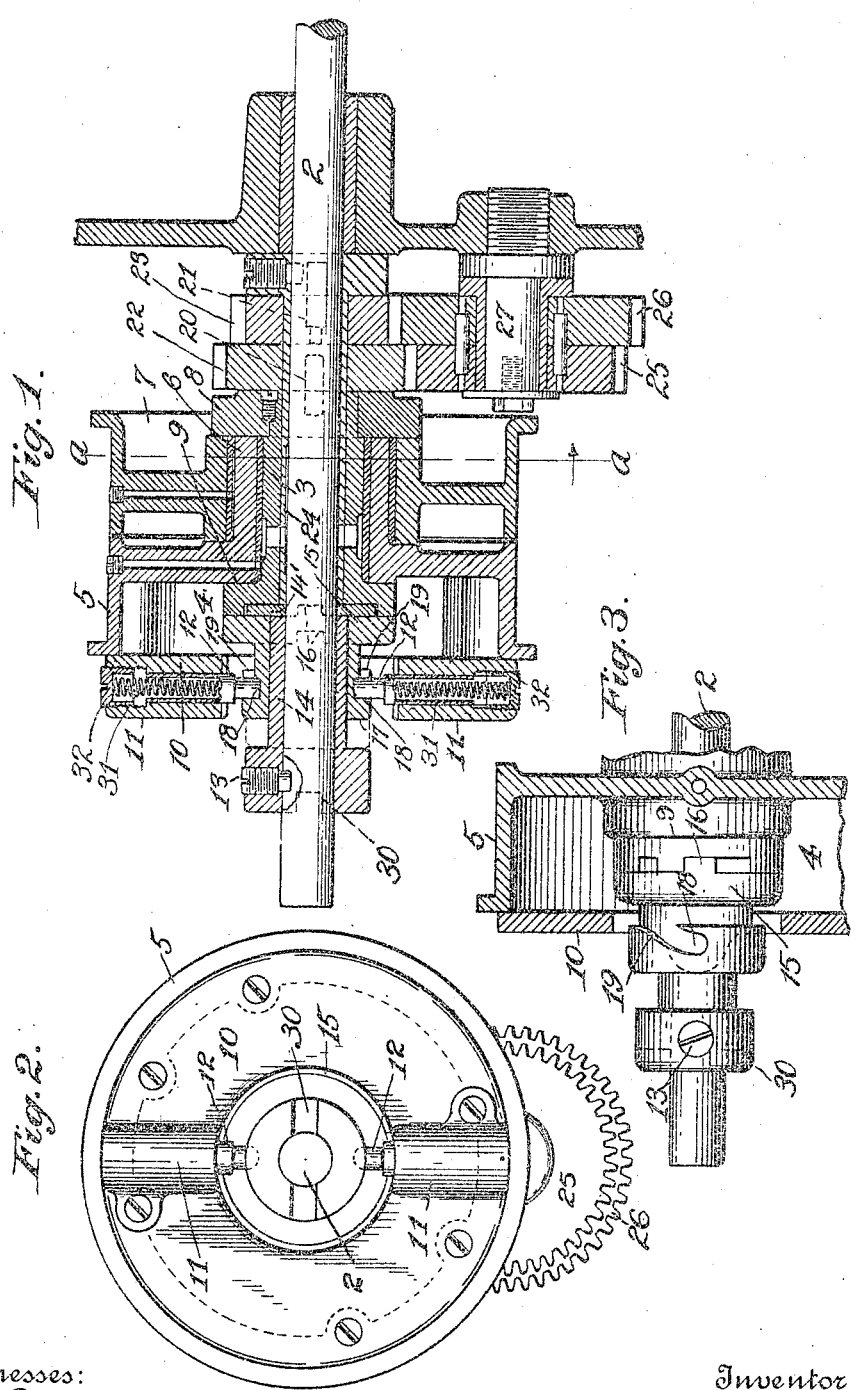

UNITED STATES PATENT OFFICE.

FREDERICK P. GLOSH, OF CLEVELAND, OHIO, ASSIGNOR TO THE NATIONAL-ACME MANUFACTURING COMPANY, OF CLEVELAND, OHIO, A CORPORATION OF OHIO.

OVERLOAD-CLUTCH.

1,033,794.

Specification of Letters Patent.

Patented July 30, 1912.

Application filed August 5, 1911. Serial No. 642,438.

*To all whom it may concern:*

Be it known that I, FREDERICK P. GLOSH, a citizen of the United States, residing at Cleveland, in the county of Cuyahoga and State of Ohio, have invented certain new and useful Improvements in Overload-Clutches, of which the following is a specification.

This invention relates to clutches, the object of the invention being to provide an improved clutch in which the driving and driven members will be disconnected when an abnormal strain or overload is placed on the mechanism in connection with which the clutch is used, thereby to prevent breakage of such mechanism, and which clutch will therefore be designated herein as an overload clutch, one of the objects being to provide a clutch of this character comparatively simple in construction and effective in use.

In the drawings accompanying and forming part of this specification, Figure 1 is a sectional view of this improved clutch; Fig. 2 is a left-hand end view thereof; Fig. 3 is a detail view, partly in section, illustrating the clutch end of the clutch; Fig. 4 is a perspective view of this improved clutch; and Fig. 5 is an end view, partly in section, of the driving and driven gears actuated by the clutch.

Similar characters of reference indicate corresponding parts throughout the figures of the drawings.

On the shaft 2, which is suitably supported in any desired manner, is fitted to run freely a clutch sleeve 3 having on its enlarged front end the usual clutch teeth 4. On this sleeve 3 is fitted to run freely a driving pulley 5, on the hub 6 of which is fitted to run loosely a pulley 7 and which constitutes the idle pulley of the mechanism and upon which the belt may be shifted in any suitable manner when the machine is running idle. This pulley 7, as well as the driving pulley 5, is secured in position against endwise movement by a collar 8 fastened to a shoulder of the clutch sleeve 3 and which engages the hubs of the two pulleys, the opposite face of the driving pulley 5 being held against a shoulder 9 of the clutch sleeve 3 by this collar 8. Fastened to the face of the driving pulley 5 is a disk 10 having on the center line of the face thereof two extended bearings 11, in which are housed two spring plungers 12. Fastened to the shaft 2, by means of a set screw 13, is a sleeve 14. Fitted on this sleeve 14 to rotate freely is a companion clutch member 15 having clutch teeth 16 adapted to coöperate with the clutch teeth 4 of the clutch sleeve 3. This clutch member has its hub 17 provided with a pair of depressions 18, each at the end of a cam portion 19 machined on the periphery of this clutch member 15. The collar 8 is connected by a pair of driving pins 20 and 21 with a pair of gears 22 and 23 rotatably supported by a suitable bushing 24 which extends through the bore of the clutch member 3, and these gears in turn mesh with another pair of gears 25 and 26 suitably supported by a stub shaft 27, and which train of gears thus receives motion from the driven clutch member 3, to which the collar is fastened. It will, of course, be understood, that this driven clutch member 3 may be utilized to impart motion to a pulley or to other means instead of the train of gears shown.

In operation, motion being imparted to the driving pulley 5 by means of a suitable belt, not shown, and the driving and driven clutch teeth 16 and 4 of the members 15 and 3 being in engagement and the pins 12 projecting into the depressions 18 of the driving clutch member 15, it will be observed that motion is imparted from the driven clutch member to the train of gears by means of the collar 8 and the pins connecting the same with a pair of the gears. When, however, there is a breaking strain on the driven portions of the machine, as for instance the gears in the present instance, the clutch member 15 is forced out of connection with the clutch member 3, owing to the cam portions 19 on the clutch member 15; that is to say, the inclined surfaces of the cam portions ride against the spring actuated pins or plungers 12 and so force the driving clutch member 15 away from the driven clutch member 3 and thus disconnect the two clutch members and so permit the driving pulley 5 to run idle. In the end of the sleeve 14 fastened to the shaft 2 is a notch or recess 30. This sleeve 14 being fast to shaft 2, with its inner end engaging the thrust washer 14' prevents the mechanism from slipping off the shaft. In order to set up a machine in which this overload clutch is a part, or time its movements, it is often necessary to turn the shaft 2 by hand. This is done by means of a crank being slipped on the end of the shaft 2, said crank having lugs or projections on its hub which coincide with the slot 30 in the sleeve 14. From this it will be seen that by turning the crank the shaft 2 will be turned direct, and not through the train of gears 22, 23, 25 and 26, and this operation can be performed whether the clutches 15 and 3 are in connection or not. When the clutch member 15 has been thrown out of connection with the clutch member 3 by means of the spiral cam groove 19 hereinbefore described it will have moved outward on sleeve 14, as shown in dotted lines in Fig. 1, and against the shoulder of said sleeve. Since the teeth of clutches 15 and 3 are then no longer in connection the pulley 5 will revolve loose on the hub of clutch member 3, so that the pins 12 will ride free on clutch 15, and since the cam faces 19 have their spiral in the same direction that the pulley must rotate it follows that clutch 15 will remain in the position into which it has been foced by the pins 12, or, in other words, against the shoulder of the sleeve 14.

The re-setting of the clutch 15 is best accomplished by shifting the belt to loose pulley 7, which is mounted on the hub of pulley 5. Having thus stopped the rotation of pulley 5, which has on its outer face the disk 10 carrying the pins 12, it is obvious that by turning the clutch 15, (which is free to turn on sleeve 14 in any direction), until the entrances of cam recesses 19 are opposite the pins 12 a slight shove by the hand will again place the pins 12 and clutch members 15 and 3 in connection.

From the foregoing it will be observed that the driving pulley 5, through the medium of the spring actuated pins 12, rotates the driving clutch member 15 so long as the ends of the pins project properly into the depressions of the driving clutch member, at which time the clutch teeth of the driving clutch member will engage the teeth of the driven clutch member 3, but that when abnormal strain or overload is placed upon the gears or other driven means the pins 12 will be forced from the depressions 18 and the inclined faces of the cam portions 19 of the driving clutch member 15 will ride against the pins and so force the driving clutch member 15 away from the driven clutch member 3, such movement being limited by the collar of the sleeve 14, thus permitting the driving pulley 5, as hereinbefore stated, to run idle. The springs 31 controlling the action of the pins or plungers 12 are held in place by means of screws 32, by means of which the tension of the springs may be readily adjusted as may be desired.

I claim as my invention:

1. An overload clutch comprising a driven and a driving clutch member, one shiftable toward and from the other, driving means for one of said clutch members, spring actuated means carried by said driving means for engaging one of said clutch members to rotate the same, and means carried by said last clutch member and engaging said spring actuated means whereby on an overload one of said clutch members will be forced away from its companion clutch member.

2. An overload clutch comprising a driven clutch member, a driving clutch member adapted to coöperate with the driven clutch member and shiftable toward and from the same, driving means, spring actuated means carried thereby for engaging said driving clutch member to rotate the same, and means carried by said driving clutch member and coöperating with said spring actuated means whereby on an overload the driving clutch member will be forced away from the driven clutch member.

3. An overload clutch comprising a driven clutch member, a driving clutch member adapted to coöperate therewith and shiftable toward and from the same, driving means, a spring actuated pin or pins carried by said driving means for engaging said driving clutch member to rotate the same, and means carried by said driving clutch member and coöperating with said pin or pins whereby on an overload the driving clutch member will be forced away from the driven clutch member.

4. An overload clutch comprising a shaft, a driven clutch member loosely mounted thereon, a driving clutch member adapted to coöperate with the driven clutch member and shiftable toward and from the same, driving means, spring actuated pins carried by said driving means for engaging said driving clutch member to rotate the same, cams carried by said driving clutch member and coöperating with said pins whereby on an overload the driving clutch member will be forced away from the driven clutch member.

5. An overload clutch comprising a shaft, a driven clutch member loosely mounted thereon, a driving clutch member adapted to coöperate with the driven clutch member and shiftable toward and from the same, a driving pulley loosely mounted on said driven clutch member, a pair of oppositely disposed spring actuated pins for engaging said driving clutch member to rotate the same, cams carried by said driving clutch member and coöperating with said pins whereby on an overload the driving clutch member will be forced away from the driven clutch member.

6. An overload clutch comprising a shaft, a driven clutch member loosely mounted thereon, means fastened thereto and driven thereby, a driving clutch member cooperating with said driven clutch member and shiftable toward and from the same and having a pair of depressions and a pair of cam surfaces communicating therewith, a driving pulley mounted on said driven clutch member, spring actuated pins carried by said driving pulley and adapted to project into said depressions and to be engaged by said cam surfaces whereby on an overload the driving clutch member will be forced away from the driven clutch member.

7. An overload clutch comprising a shaft, a driven clutch member loosely mounted thereon, means connected therewith and driven thereby, a driving clutch member rotatably supported on the shaft and shiftable toward and from the driven clutch member and having depressions and cam surfaces communicating with the depressions, a driving pulley loosely mounted on said driven clutch member, spring actuated pins carried by said driving pulley and adapted to project into the depressions of the driving clutch member and to be engaged by the cam surfaces thereof whereby on an overload the driving clutch member will be forced away from the driven clutch member.

8. An overload clutch comprising a shaft, a driven clutch member loosely mounted thereon, means connected therewith and driven thereby, a driving clutch member rotatably supported on the shaft and shiftable toward and from the driven clutch member and having depressions and cam surfaces communicating with the depressions, a driving pulley loosely mounted on said driven clutch member, spring actuated pins carried by said driving pulley and adapted to project into the depressions of the driving clutch member and to be engaged by the cam surfaces thereof whereby on an overload the driving clutch member will be forced away from the driven clutch member, and means carried by said shaft to enable the same to be turned directly.

9. An overload clutch comprising a shaft, a driven clutch member loosely mounted thereon, means connected therewith and driven thereby, a driving clutch member rotatably supported on the shaft and shiftable toward and from the driven clutch member and having depressions and cam surfaces communicating with the depressions, a driving pulley loosely mounted on said driven clutch member, spring actuated pins carried by said driving pulley and adapted to project into the depressions of the driving clutch member and to be engaged by the cam surfaces thereof whereby on an overload the driving clutch member will be forced away from the driven clutch member, and means carried by said shaft to enable the same to be turned directly, said means comprising a sleeve fastened to the shaft and on which the driving clutch member rotates.

10. An overload clutch comprising a shaft, a driven clutch member loosely mounted thereon, a driving pulley mounted on said driven clutch member, a sleeve fastened to said shaft, a driving clutch member rotatable on said sleeve, spring actuated means carried by said driving pulley and effective to engage the driving clutch member to rotate the same, and means carried by said driving clutch member for engaging with said spring actuated means whereby on an overload the driving clutch member will be forced away from the driven clutch member.

11. An overload clutch comprising a driven clutch member, a driving clutch member adapted to coöperate with the driven clutch member and shiftable toward and from the same, a pulley loosely mounted on the driven clutch member and overhanging the driving clutch member, means carried by said driving pulley for engaging said driving clutch member to rotate the same, and means carried by said driving clutch member and adapted to coöperate with said means, whereby on an overload the driving clutch member will be forced away from the driven clutch member.

12. An overload clutch comprising a shaft, a driven clutch member loosely mounted thereon, means fastened thereto and driven thereby, a driving clutch member adapted to coöperate with the driven clutch member and shiftable toward and from the same and rotatable relatively to said shaft, a driving pulley mounted on said driven clutch member and overhanging the driving clutch member, spring actuated pins supported on the face of said driving pulley, said driving clutch member having depressions for the reception of said pins and also having cam surfaces adapted to coöperate with the pins, whereby on an overload the driving clutch member will be forced away from the driven clutch member.

13. An overload clutch comprising a driven clutch member, a driving clutch member adapted to coöperate therewith and shiftable toward and from the same, a driving pulley, said pulley and driving clutch member having one spring actuated projections and the other depressions for the reception thereof, whereby motion is imparted from the pulley to the driving clutch member, said driving pulley and driving clutch member also having one means for engaging said projections, whereby on an overload the driving clutch member will be forced away from the driven clutch member.

14. An overload clutch comprising a shaft, a driven clutch member loosely mounted thereon, a driving clutch member adapted to coöperate with the driven clutch member and shiftable toward and from the same, a driving pulley, said driving pulley and driving clutch member having one spring actuated projections and the other depressions for the reception of said projections and said pulley and driving clutch member also having one cam surfaces for engaging said projections, whereby on an overload the driving clutch member will be forced away from the driven clutch member.

15. An overload clutch comprising a shaft, a driven clutch member loosely mounted thereon, a driving clutch member adapted to coöperate with the driven clutch member and shiftable toward and from the same, a driving pulley, said driving pulley and driving clutch member having one spring actuated projections and the other depressions for the reception of said projections and said pulley and driving clutch member also having one cam surfaces for engaging said projections, whereby on an overload the driving clutch member will be forced away from the driven clutch member, said projections being located transversely to the axis of the shaft.

16. An overload clutch comprising a shaft, a driven clutch member loosely mounted thereon, a driving clutch member adapted to coöperate with the driven clutch member and shiftable toward and from the same, a driving pulley, said driving pulley and driving clutch member having one spring actuated projections and the other depressions for the reception of said projections and said pulley and driving clutch member also having one cam surfaces for engaging said projections, whereby on an overload the driving clutch member will be forced away from the driven clutch member, said projections being located transversely to the axis of the shaft, and means carried by the shaft to enable the shaft to be turned directly.

17. An overload clutch comprising a shaft, a driven clutch member loosely mounted thereon, a driving pulley loosely mounted on said clutch member, a driving clutch member rotatable relatively to said shaft and shiftable toward and from the driven clutch member and having depressions therein and also provided with cam faces, and spring actuated pins carried by said driving pulley for movement transversely to the axis of the shaft and adapted to engage said depressions and on an overload to be engaged by said cam faces thereby to shift the driving clutch member from the driven clutch member.

18. An overload clutch comprising a shaft, a driven clutch member loosely mounted thereon, a driving pulley loosely mounted on said clutch member, a driving clutch member rotatable relatively to said shaft and shiftable toward and from the driven clutch member and having depressions therein and also provided with cam faces, spring actuated pins carried by said driving pulley for movement transversely to the axis of the shaft and adapted to engage said depressions and on an overload to be engaged by said cam faces thereby to shift the driving clutch member away from the driven clutch member, and means secured to said shaft and on which the driving clutch member is mounted to enable the shaft to be turned.

Signed at Cleveland, county of Cuyahoga and State of Ohio, this 1st day of August, 1911.

FREDERICK P. GLOSH.

Witnesses:
E. C. WOOLGAR,
S. M. MATHEWS.